(12) United States Patent
Komatsubara (10) Patent No.: US 10,871,195 B2
(45) Date of Patent: Dec. 22, 2020

(54) CONTROL DEVICE FOR TORQUE DISTRIBUTOR

(71) Applicant: HONDA MOTOR CO., LTD., Tokyo (JP)

(72) Inventor: Masaru Komatsubara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 16/468,500

(22) PCT Filed: Dec. 4, 2017

(86) PCT No.: PCT/JP2017/043485
§ 371 (c)(1),
(2) Date: Jun. 11, 2019

(87) PCT Pub. No.: WO2018/110348
PCT Pub. Date: Jun. 21, 2018

(65) Prior Publication Data
US 2019/0301546 A1 Oct. 3, 2019

(30) Foreign Application Priority Data
Dec. 13, 2016 (JP) ................................ 2016-241697

(51) Int. Cl.
*B60K 17/35* (2006.01)
*F16D 48/02* (2006.01)
(Continued)

(52) U.S. Cl.
CPC ............ *F16D 48/02* (2013.01); *B60K 17/348* (2013.01); *B60K 23/0808* (2013.01);
(Continued)

(58) Field of Classification Search
CPC .... B60W 10/119; B60W 10/14; B60W 30/02; B60W 2510/0241; B60W 2520/263;
(Continued)

(56) References Cited

U.S. PATENT DOCUMENTS 6,487,486 B1 * 11/2002 Anderson .............. B60K 23/04
701/69
9,020,723 B2 * 4/2015 Shigeta .................. B60K 17/35
701/69
(Continued)

FOREIGN PATENT DOCUMENTS

JP 58-193937 A 11/1983
JP 1-226443 A 9/1989
(Continued)

OTHER PUBLICATIONS

International Search Report dated Feb. 20, 2018, issued in counterpart International Application No. PCT/JP2017/043485 (2 pages).

*Primary Examiner* — Roger L Pang
(74) *Attorney, Agent, or Firm* — Westerman, Hattori, Daniels & Adrian, LLP (57) ABSTRACT

A control device for a torque distributor provided with a control means acquiring a demand value of a torque distributed to second driving wheels (W3, W4) using a torque distributor (10) and outputs a command value (TR) of torque corresponding to the demand value of torque. When a variation per unit time (ND) of a differential rotation speed (NS) between a drive source (3) side and a second driving wheel side with respect to the torque distributor in a torque transmission path (20) is a predetermined first threshold (ND1) or more, the control means (60) performs a torque command value limit control controlling the torque command value to a predetermined limit value (TR1) or less. This can secure the running stability necessary for the vehicle by distributing an appropriate torque to the second (Continued)

driving wheels using the torque distributor, while enabling proper protection of components including the torque distributor.

11 Claims, 5 Drawing Sheets

(51) Int. Cl.
    *B60K 17/348*     (2006.01)
    *B60K 23/08*     (2006.01)
    *B60W 30/02*     (2012.01)
    *B60W 10/14*     (2012.01)
    *B60W 10/119*     (2012.01)

(52) U.S. Cl.
    CPC ............ *B60W 10/119* (2013.01); *B60W 10/14* (2013.01); *B60W 30/02* (2013.01); *B60W 2510/0241* (2013.01); *B60W 2520/263* (2013.01); *B60W 2710/027* (2013.01)

(58) Field of Classification Search
    CPC ......... B60W 2710/027; B60K 23/0808; B60K 17/35; F16D 2500/10431; F16D 2500/3027; F16D 2500/30415; F16D 2500/30426
    USPC .......................................................... 701/69
    See application file for complete search history.

(56) References Cited

U.S. PATENT DOCUMENTS

| | | |
|---|---|---|
| 2014/0020374 A1 | 1/2014 | Sugo et al. |
| 2014/0297146 A1* | 10/2014 | Murakami ............ G05D 17/02 701/69 |
| 2018/0029472 A1 | 2/2018 | Yoshida |
| 2020/0009962 A1* | 1/2020 | Tanaka ............ B60W 30/18063 |

FOREIGN PATENT DOCUMENTS

| | | |
|---|---|---|
| JP | 10-272949 A | 10/1998 |
| JP | 2010-23734 A | 2/2010 |
| JP | 2013-184688 A | 9/2013 |
| JP | 5607240 B2 | 10/2014 |
| WO | 2016/133084 A1 | 8/2016 |

* cited by examiner

CONTROL DEVICE FOR TORQUE DISTRIBUTOR

TECHNICAL FIELD

The present invention relates to a control device for a torque distributor for a vehicle provided with a control means that controls a torque of power from a power source distributed by the torque distributor to first driving wheels (namely, main driving wheels) and second driving wheels (namely, auxiliary driving wheels).

BACKGROUND ART

Conventionally, a four-wheel-drive vehicle includes a torque distributor for distributing a torque of power generated in a power source such as an engine to main driving wheels and auxiliary driving wheels. In this kind of a four-wheel-drive vehicle, if front wheels are the main driving wheels and rear wheels are the auxiliary driving wheels, for instance, a torque of the power generated in the power source is transmitted to the front wheels via a front drive shaft and a front differential, and to the torque distributor having a multi-disc clutch (hereinafter occasionally referred to as "clutch") via a propeller shaft. And, by supplying hydraulic fluid at a predetermined pressure to the torque distributor from a hydraulic control device, an engagement pressure of the torque distributor is controlled. Thus, the torque of the power from the power source is transmitted to the rear wheels at a predetermined distribution ratio.

In the above-described torque distributor, when an excessive differential rotation (namely, a clutch differential rotation) occurs to the torque distributor (namely, the clutch) due to idling of the front wheels, an excessive torque exceeding a guarantee torque, which guarantees the intensity of a case of the torque distributor, may occur with the rise in clutch friction coefficient. Therefore, in consideration of both the intensity guarantee demand for the components such as the case of the torque distributor and the running stability (namely, running performance) demand for the vehicle, it is necessary to perform control to limit the torque distributed to the rear wheels using the torque distributor under the circumstances that the excessive clutch differential rotation has occurred. As a technique for this purpose, Conventionally, in order to limit an input (namely, occurrence/generation) of an excessive torque when a differential rotation speed of input and output shafts of the torque distributor exceeds a predetermined allowance, a limit control is performed to limit a torque command value for the torque distributor (namely, a command value of a torque distributed to the rear wheels) to a predetermined limit value.

RELATED ART DOCUMENTS

Patent Documents

[Patent Document 1] Japanese Patent No. 5607240
[Patent Document 2] WO2016/133084 Bulletin However, there is a problem that the excessive differential rotation amount of the torque distributor does not necessarily cause the excessive torque. In addition, in the control to limit the input of the excessive torque when the differential rotation speed of the input and output shafts of the torque distributor exceeds a predetermined threshold, the threshold might have to be set to an extremely small value in order to surely prevent the excessive torque from being input into the torque distributor, depending on a configuration of a torque transmission system, including the torque distributor, of the vehicle. This might cause deficiency in the driving force necessary for the rear wheels depending on a condition of the road surface on which the vehicle runs, thereby failing to secure the running stability (namely, running performance) necessary for the vehicle.

DISCLOSURE OF THE INVENTION

Problems to be Solved by the Invention

The present invention was made in view of the above-mentioned problem, and the purpose is to provide the control device for the torque distributor that can secure the running stability necessary for the vehicle by distributing an appropriate torque to the second driving wheels using the torque distributor, while enabling proper protection of components including the torque distributor.

Means of Solving the Problems

To solve the problem, the present invention provides a control device for a torque distributor of a vehicle. The vehicle (1) includes a torque transmission path (20) that transmits a torque of power from a power source (3) to first driving wheels (W1, W2) and second driving wheels (W3, W4), a torque distributor (10) including a hydraulic drive-type multidisc friction-type connecting and disconnecting means disposed between the power source (3) and the second driving wheels (W3, W4) in the torque transmission path (20), and a control means (60) that acquires a demand value of the torque distributed to the second driving wheels (W3, W4) using the torque distributor (10) and outputs a command value of the torque corresponding to the demand value of the torque. When a variation (ND) per unit time of a differential rotation speed (NS) between the power source (3) side and the second driving wheel (W3, W4) side with respect to the torque distributor (10) in the torque transmission path (20) is greater than or equivalent to a predetermined threshold (ND1), the control means (60) characteristically performs a torque command value limit control that limits a command value (TR) of the torque to smaller than or equivalent to a predetermined limit value (TR1). In addition, the variation (ND) per unit time of the differential rotation speed (NS) may be a derivative (ND) of the differential rotation speed (NS).

In the vehicle configured to distribute and transmit the torque to the second driving wheels using the torque distributor of the present invention, it is considered that an excessive torque exceeding an allowance tends to occur more easily in the case that the variation per unit time of the differential rotation speed of the torque distributor is excessive than in the case that the differential rotation amount of the torque distributor is excessive. Therefore, in the present invention, the torque command value limit control that limits the command value of the torque to smaller than or equivalent to the predetermined limit value is performed when the variation per unit time of the differential rotation speed between the power source side and the second driving wheel side with respect to the torque distributor in the torque transmission path is the predetermined threshold value or more. This can secure the running stability necessary for the vehicle by distributing an appropriate torque to the second driving wheels using the torque distributor, while enabling proper protection of components including the torque distributor.

Moreover, the control device for the torque distributor in accordance with the present invention includes a wheel speed acquisition means (36) that acquires a wheel speed (VWR) of the second driving wheels (W3, W4). When the wheel speed (VWR) of the second driving wheels (W3, W4) acquired by the wheel speed acquisition means (36) is smaller than or equivalent to a second threshold (VW1), the control means (60) should perform the torque command value limit control.

According to this configuration, by performing the torque command value limit control when the wheel speed of the second driving wheels is smaller than or equivalent to the second threshold, on one hand, the torque command value limit control in accordance with the present invention can be performed more surely in a situation where any occurrence (input) of an excessive torque in the torque distributor is preferably evaded (for instance, in a situation where on a rough road, the first driving wheels (for instance, the front wheels of this embodiment) are rotating (namely, idling) at a relatively high speed and the second driving wheels (for instance, the rear wheels of this embodiment) are substantially at stop). On the other hand, the torque command value limit control in accordance with the present invention can be preferably evaded in a situation where the driving performance of the vehicle is preferably secured more surely (for instance, in a situation where the vehicle is running on a hill-climbing road). Thus, the torque command value limit control according to the present invention can both properly protect the components such as the torque distributor and secure the running performance necessary for the vehicle.

In addition, in the control device for the torque distributor in accordance with the present invention, the torque distributor may include the hydraulic drive-type multidisc friction-type connecting and disconnecting means. In this hydraulic drive-type multidisc friction-type connecting and disconnecting means, a torque exceeding the allowance easily occurs when the variation per unit time of the differential rotation speed is excessive. In the present invention, however, such excessive torque can be effectively prevented by performing the above-described torque command value limit control.

Furthermore, the control device for the torque distributor in accordance with the present invention includes a vehicle behavior stabilizer (70) that performs control to stabilize a behavior of the vehicle and a switching operation section (71) that switches between operation and non-operation of the vehicle behavior stabilizer (70) on the basis of an operation by a vehicle occupant. When the non-operation of the vehicle behavior stabilizer (70) is selected by operating the switching operation section (71), the first threshold (ND1) should be another lower value (ND1') compared to when the operation of the vehicle behavior stabilizer is selected. According to this, when the vehicle behavior stabilizer is in non-operation, the torque command value limit control is performed in the state in which the variation per unit time of the differential rotation speed is smaller. Thus, destabilization of the vehicle behavior due to the vehicle behavior stabilizer being in non-operation can be avoided.

Further, when the non-operation of the vehicle behavior stabilizer (70) is selected by operating the switching operation section (71), the predetermined limit value (TR1) of the torque command value should be another lower value (TR1'), compared to when the operation of the vehicle behavior stabilizer (70) is selected. According to this, when the vehicle behavior stabilizer is in non-operation, the command value of the torque distributed to the second driving wheels can be suppressed to a smaller value, which can effectively prevent an excessive torque from occurring to the second driving wheels. Thus, destabilization of the vehicle behavior due to the vehicle behavior stabilizer being in non-operation can be avoided.

Effects of the Invention

The control device for the torque distributor in accordance with the present invention can appropriately secure the running stability necessary for the vehicle while preventing an excessive torque exceeding the allowance from being input (namely, generated) to a torque transmission device in an attempt to achieve proper protection of the vehicle components including the torque distributor.

MODE FOR CARRYING OUT THE INVENTION

Hereinafter, an embodiment of the present invention will be described in detail with reference to the accompanying drawings.

Figure 1:
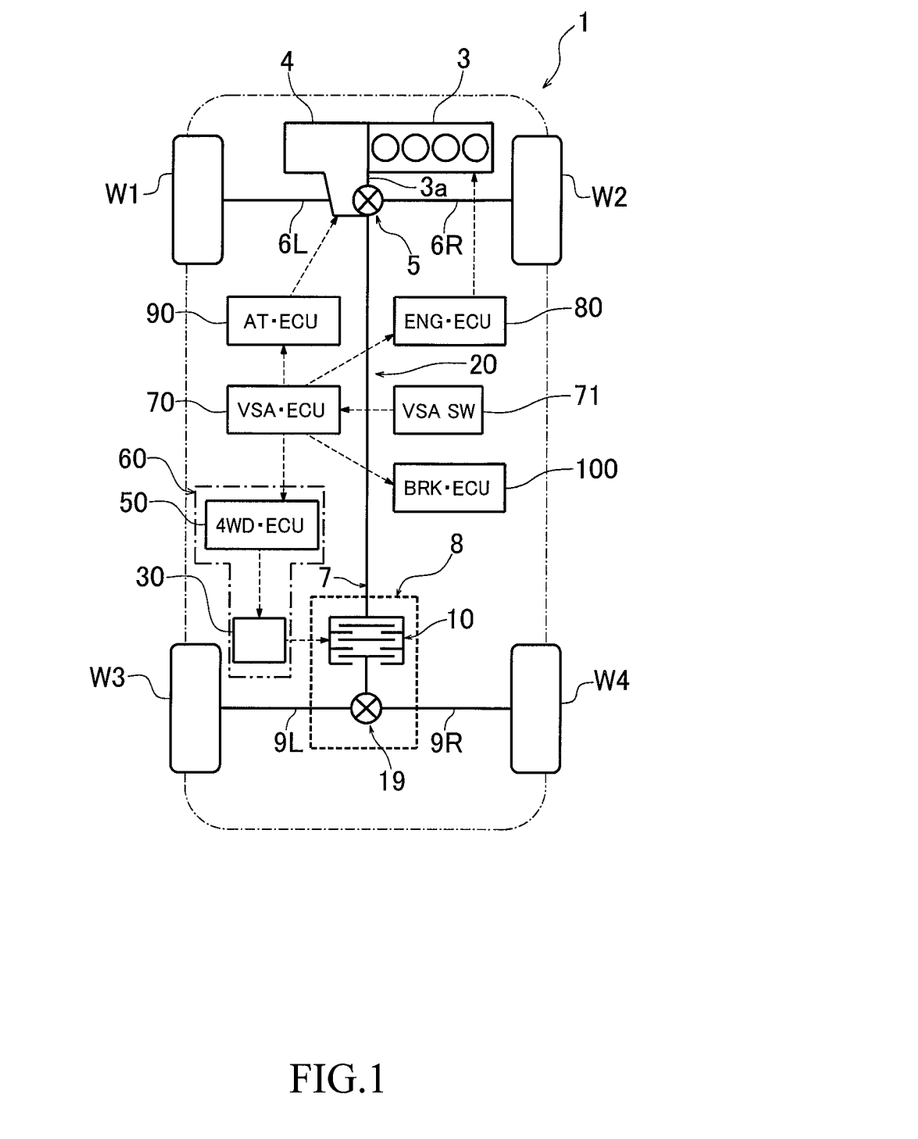
FIG. 1 is a schematic view illustrating a configuration of a four-wheel-drive vehicle including a control device for a torque distributor in accordance with one embodiment of the present invention.

FIG. 1 is a schematic view illustrating a configuration of a four-wheel-drive vehicle including a control device for a torque distributor in accordance with the embodiment of the present invention. The four-wheel-drive vehicle (hereinafter referred to as "vehicle") 1 shown in the same figure includes an engine (namely, a drive source) 3 transversely installed to the front of the vehicle, an automatic transmission 4 disposed integrally with the engine 3, and a torque transmission path 20 for transmitting a torque of power from the engine 3 to front wheels W1, W2 and rear wheels W3, W4.

An output shaft (not shown in the figure) of the engine 3 is connected to the left and right front wheels W1, W2, which are main driving wheels (namely, first driving wheels), via the automatic transmission 4, a front differential (hereinafter referred to as "front diff") 5, and left and right front drive shafts 6L, 6R. In addition, the output shaft of the engine 3 is connected to the left and right rear wheels W3, W4, which are auxiliary driving wheels (namely, second driving wheels), via the automatic transmission 4, the front diff 5, a propeller shaft 7, a rear differential unit (hereinafter referred to as "rear diff unit") 8, and left and right rear drive shafts 9L, 9R.

The rear diff unit 8 is equipped with a rear differential (hereinafter referred to as "rear diff") 19 and a front and rear torque distribution clutch 10. The rear diff 19 distributes a driving force to the left and right rear drive shafts 9L, 9R. The front and rear torque distribution clutch 10 connects and disconnects the torque transmission path 20 from the propeller shaft 7 to the rear diff 19. The front and rear torque distribution clutch 10 is a hydraulic clutch (namely, hydraulic drive-type multidisc friction-type connecting and disconnecting means) and is also the torque distributor for controlling the torque distributed to the rear wheels (namely, the second driving wheels) W3, W4 in the torque transmission path 20. The vehicle 1 also includes a hydraulic circuit 30 for supplying hydraulic fluid to the front and rear torque distribution clutch 10 and a 4WD/ECU 50 that is a control means for controlling a hydraulic pressure supplied by the hydraulic circuit 30. The 4WD, ECU 50 is composed of a microcomputer and other devices. A control unit (namely, the control means) 60 for controlling a torque (namely, power) distributed to the rear wheels W3, W4 using the front and rear torque distribution clutch 10 serving as the torque distributor is composed of the hydraulic circuit 30 and the 4WD/ECU 50.

The 4WD/ECU 50 controls a hydraulic pressure supplied by the hydraulic circuit 30, thereby controlling a torque distributed to the rear wheels W3, W4 using the front and rear torque distribution clutch (hereinafter simply referred to as "clutch") 10. In this manner, drive control is performed with the front wheels W1, W2 and the rear wheels W3, W4 serving respectively as the main driving wheels and the auxiliary driving wheels.

In other words, while the clutch 10 is released (namely, disconnected), no rotation of the propeller shaft 7 is transmitted to the rear diff 19 side. Instead, the whole torque of the engine 3 is transmitted to the front wheels W1, W2 so as to enter the front-wheel drive (2WD) state. On the other hand, while the clutch 10 is connected, the rotation of the propeller shaft 7 is transmitted to the rear diff 19 side. Consequently, the torque of the power from the engine 3 is distributed to both the front wheels W1, W2 and the rear wheels W3, W4 so as to enter the four-wheel drive (4WD) state. On the basis of results detected from various detection means (not shown in the figure) for detecting a running condition of the vehicle, the 4WD/ECU 50 calculates a torque distributed to the rear wheels W3, W4 and a corresponding hydraulic pressure supplied to the clutch 10, and in turn outputs a signal on the basis of these calculation results to the clutch 10. This controls an engaging force of the clutch 10 and thus controls the torque distributed to the rear wheels W3, W4.

Moreover, the vehicle 1 is provided with an ENG/ECU 80 for controlling the engine 3, an AT/ECU 90 for controlling the automatic transmission 4, a BRK/ECU 100 for controlling a brake (namely, a breaking means), which is not shown in the figure, and a VSA/ECU 70 for a vehicle behavior stabilization control (namely, VSA: Vehicle Stability Assist Control). The VSA/ECU 70, the ENG/ECU 80, the AT/ECU 90 and the BRK/ECU 100 are composed of a microcomputer, a ROM, a RAM, a peripheral circuit, an input-output interface and various drivers and are connected to each other via predetermined communication lines. Each of ECUs 70, 80, 90, 100 is also configured to perform respective controls on the basis of results detected by various detection means (not shown in the figure) for detecting a running condition of the vehicle 1. In addition, a VSA switch (namely, a switching operation means) 71 is provided in vicinity of the driver's seat of the vehicle 1, although not illustrated in detail. The VSA switch 71 can manually switch ON (namely, VSA control being in operation, which will be described below) and OFF (namely, VSA control being in non-operation) of the VSA/ECU 70 by an operation of the vehicle driver.

The VSA/ECU 70 sets each control amount of the 4WD/ECU 50, the ENG/ECU 80, the AT/ECU 90 and the BRK/ECU 100 based on results detected by the above-described various detection means and thus outputs the set control amount as a predetermined control signal. As well as an ABS (namely, Antilock Brake System) for preventing locking of the wheels at the time of braking and a TCS (namely, Traction Control System) for preventing idling of the wheels at the time of acceleration, the vehicle behavior stabilization control (hereinafter referred to as "VSA control") using this VSA/ECU 70 exhibits a well-known suppressing function of a side slip at the time of turning and thus contributes to the vehicle behavior stabilization. On the other hand, for example, when the front wheels W1, W2 or the rear wheels W3, W4 of the vehicle 1 fall into mud due to rain or snow, the driver can temporarily stop the VSA control by performing the OFF operation of the VSA switch 71 so as to escape from the mud.

Figure 2:
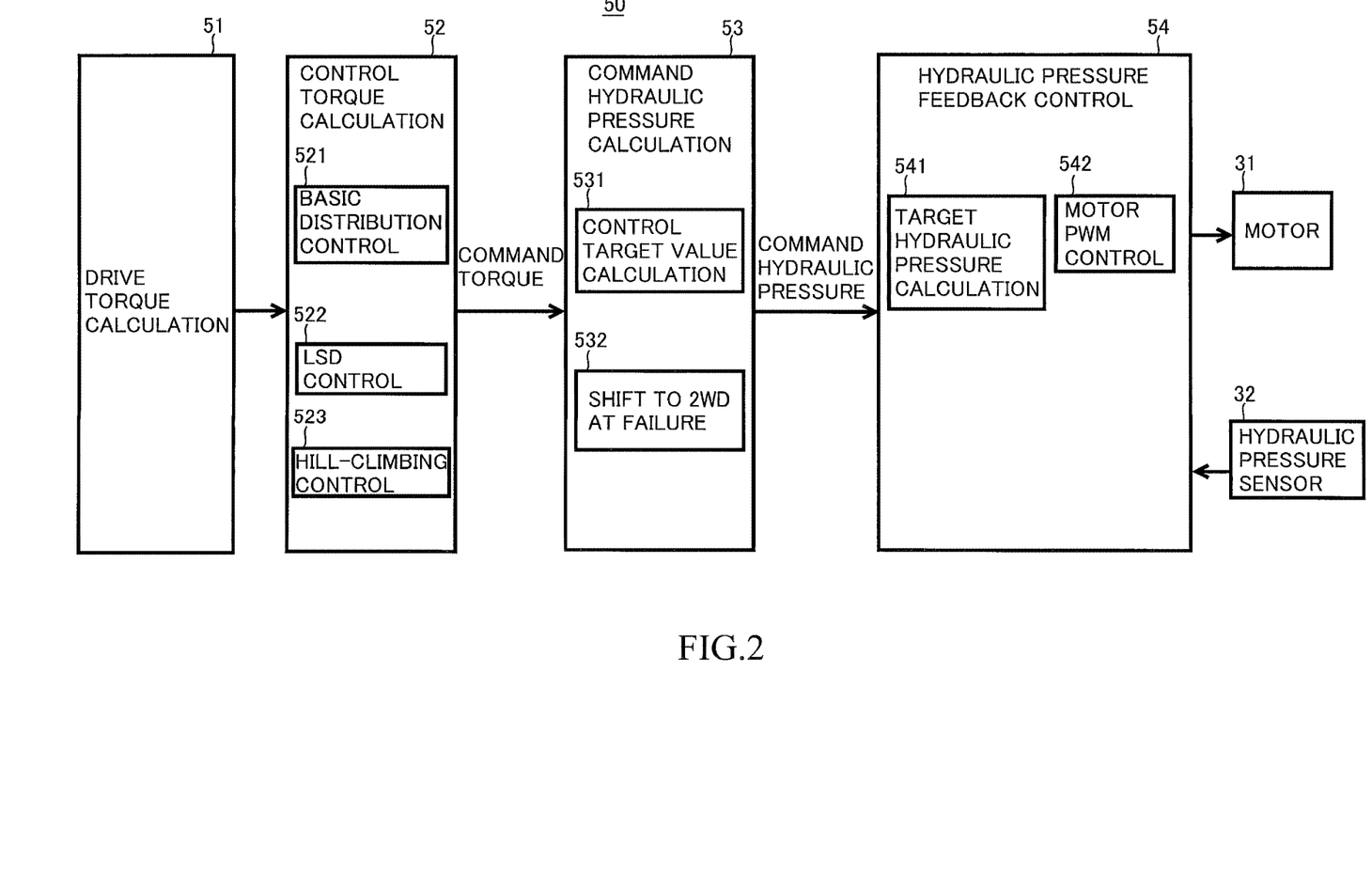
FIG. 2 is a view of a main functional block of a 4WD/ECU that functions as a control means.

FIG. 2 is a view of a main functional block of the 4WD/ECU (control means). A drive torque calculation block 51 calculates a drive torque (namely, estimated driving force) required for the vehicle 1 depending on a running condition of the vehicle 1 (such as a torque of the engine 3, a selected gear step and a shift position). In a control torque calculation block 52, a basic distribution control (namely, basic distribution control of a driving force distributed to the front and rear wheels W1-W4) block 521, an LSD control block 522, a hill-climbing control block 523, etc. determine a distribution of a drive torque transmitted to the front and rear wheels depending on various kinds of control factors and then calculate a command torque (namely, demand torque transmission amount) of the front and rear torque distribution clutch (torque distributor) 10.

A command hydraulic pressure calculation block 53 calculates a command hydraulic pressure for the clutch 10 according to the command torque (demand torque transmission amount). That is to say, a control target value calculation block 531 calculates a control target value (namely, the command hydraulic pressure) for the clutch 10 according to the command torque. And, a block for shifting to 2WD at failure 532 calculates the control target value (namely, the command hydraulic pressure) for shifting to 2WD at failure. At a normal time, on one hand, the control target value calculated by the control target value calculation block 531 is output as the command hydraulic pressure. At failure, on the other hand, the control target value calculated by the block for shifting to 2WD at failure 532 is output as the command hydraulic pressure.

In a hydraulic pressure feedback control block 54, a target hydraulic pressure calculation block 541 calculates a target hydraulic pressure of the clutch 10 according to a deviation (namely, a hydraulic pressure deviation) between the above-mentioned command hydraulic pressure given from a hydraulic pressure calculation block 53 and an actual hydraulic pressure (namely, a feedback signal from the hydraulic pressure sensor 32), so as to control the motor 31 according to this calculated target hydraulic pressure using a motor PWM control block 542. The motor 31 is an electric motor for driving a hydraulic pump (not shown in the figure) for supplying an operating hydraulic pressure to the clutch 10. The hydraulic pressure sensor 32 measures a hydraulic pressure supplied to the clutch 10. The motor PWM control block 542 generates a PWM driving command signal for the motor 31 depending on the target hydraulic pressure (namely, hydraulic deviation). Thus, hydraulic pressure feedback control is performed so that an actual hydraulic pressure follows the command hydraulic pressure.

As disclosed in Patent Document 1 (Japanese Patent No. 5607240), a solenoid valve (namely, opening and closing valve) for supplying a hydraulic pressure to the clutch 10 may be provided so that the motor is configured to perform a hydraulic pressure sealing control (namely, pressurization by intermittently driving the motor 31 in the solenoid valve closed state and depressurization by intermittently opening the solenoid valve in the motor 31 state) by opening or closing the solenoid valve (opening and closing valve) as needed, thereby reducing frequency in use of the motor 31.

Figure 3:
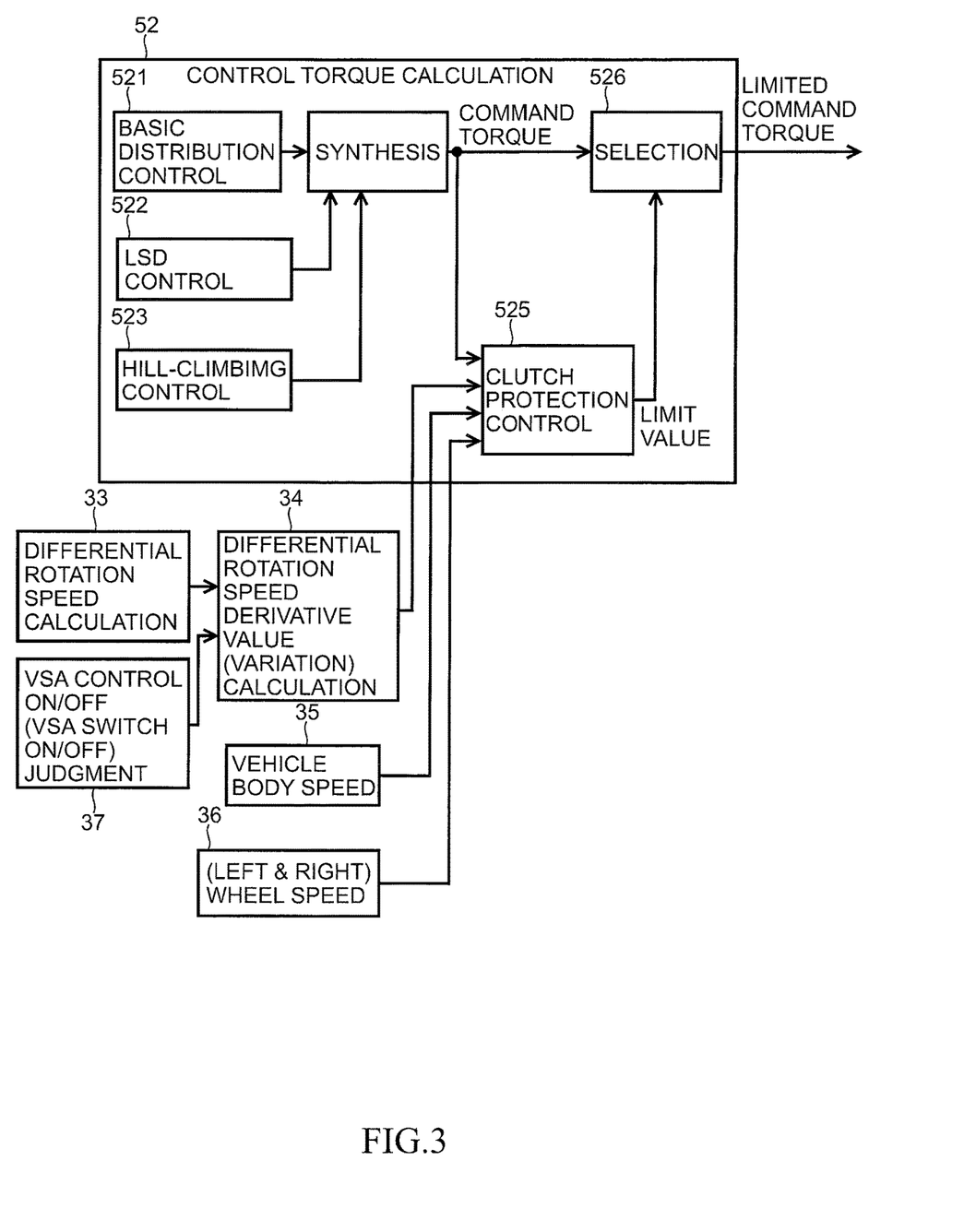
FIG. 3 is an extracted view of a control block in connection with the present invention.

FIG. 3 is a view showing selected control elements, included in the control torque calculation block 52 shown in FIG. 2, in connection with the present invention. A differential rotation speed calculation section 33 calculates a differential rotation speed of the input and output shafts of the clutch 10 (namely, a differential rotation speed of the clutch 10). Alternatively, the differential rotation speed calculation section 33 may be configured to calculate the differential rotation speed of the front wheels W1, W2 and the rear wheels W3, W4, or in effect, configured to acquire the differential rotation speed between the engine (power source) 3 side and the rear wheel (second driving wheel) W3, W4 side with respect to the clutch 10 in the torque transmission path 20. In addition, a differential rotation speed derivative value calculation section 34 calculates a derivative value (namely, a variation per unit time) of the differential rotation speed of the input and output shafts of the clutch 10 calculated in the differential rotation speed calculation section 33. It should be noted that the derivative value (variation per unit time) of the differential rotation speed of the input and output shafts of the clutch 10 here is synonymous with an acceleration rate of the differential rotation of the clutch 10. In addition, a VSA control operation/non-operation (namely, VSA switch ON/OFF) judgement section 37 judges operation/non-operation of VSA control (namely, ON/OFF of the VSA switch 71) and then inputs related information into the differential rotation speed derivative value calculation section 34. The differential rotation speed derivative value calculation section 34 is configured to differentiate the differential rotation speed derivative value (variation) calculated according to the information of the operation/non-operation of VSA control (ON/OFF of the VSA switch 71) input from the VSA control operation/non-operation judgement section 37. Specifically, the differential rotation speed derivative value is configured to be smaller in the non-operation of VSA control than in the operation thereof.

A vehicle body speed detection section 35 detects a vehicle body speed of the vehicle 1. This vehicle body speed detection section 35 may be specifically configured to be a vehicle speed sensor installed on the vehicle 1, for instance. Alternatively, it may be any means without any specific configuration as far as it can detect or calculate a vehicle body speed. For example, it may be a means that estimates a vehicle body speed from a detected value of various kinds of sensors other than the vehicle speed sensor. In addition, a wheel speed detection section 36 detects respective wheel speeds of the front wheels W1, W2 and the rear wheels W3, W4. This wheel speed detection section 36 may be specifically configured to be wheel-speed sensors installed respectively to the front wheels W1, W2 and the rear wheels W3, W4 (or the front drive shafts 6L, 6R and the rear drive shafts 9L, 9R). Alternatively, it may be any means without any specific configuration as far as it can detect or calculate wheel speeds of the front wheels W1, W2 and the rear wheels W3, W4. For example, it may be a means that estimates the wheel speed from a detected value of various kinds of sensors other than the wheel speed sensor.

For the purpose of protecting the clutch 10, a clutch protection control block 525 generates a value of a limit torque (namely, limit value) for limiting a value of the command torque (namely, demand torque transmission amount) for the clutch 10 to a predetermined limit value, in order to limit an excessive torque demand when the differential rotation speed (variation per unit time) calculated in the differential rotation speed derivative value calculation section 34 exceeds a predetermined allowance (namely, first threshold). Basically, the clutch protection control block 525 generates the predetermined limit torque value (limit value) when basic conditions are satisfied. The basic conditions referred to here are that: the vehicle body speed (vehicle speed) detected in the vehicle body speed detection section 35 should be smaller than or equivalent to a threshold speed; the wheel speed of the rear wheels W3, W4 detected in the wheel speed detection section 36 should be smaller than or equivalent to a threshold speed; the derivative value of the differential rotation speed should be larger than the predetermined allowance (namely, first threshold, which will be described below); and the command torque (demand torque transmission amount) should be larger than or equivalent to the predetermined value (limit value). Moreover, the clutch protection control block 525 is configured to differentiate the generated limit torque value (limit value) according to the judgment of the operation/non-operation of VSA control (ON/OFF of the VSA switch 71) input from the VSA control operation/non-operation judgement section 37. Specifically, the limit torque value is configured to be smaller in the non-operation of VSA control than in the operation thereof.

A selecting section 526 limits the command torque (demand torque transmission amount) calculated by the basic distribution control block 521, etc. to the said limit value output from the clutch protection control block 525 or less (or in other words, controls so that the demand torque transmission amount is limited to smaller than or equivalent to the limit value). That is to say, the selecting section 526 selects and outputs the command torque calculated by the basic distribution control block 521, the LSD control block 522, the hill-climbing control block 523, etc. (namely, synthesized value thereof), and then, if the said command torque (demand torque transmission amount) is larger than the said limit torque value, selects and outputs the said limit value (or in other words, the command torque transmission amount larger than the said limit value is limited to the said limit value, but the command torque transmission amount originally smaller than the said limit value is output as it is). In this manner, the limit-controlled torque command value is output from the selecting section 526. This limit-controlled torque command value finished with the limiting control value is given to the command hydraulic pressure calculation block 53 (FIG. 2).

Figure 4:
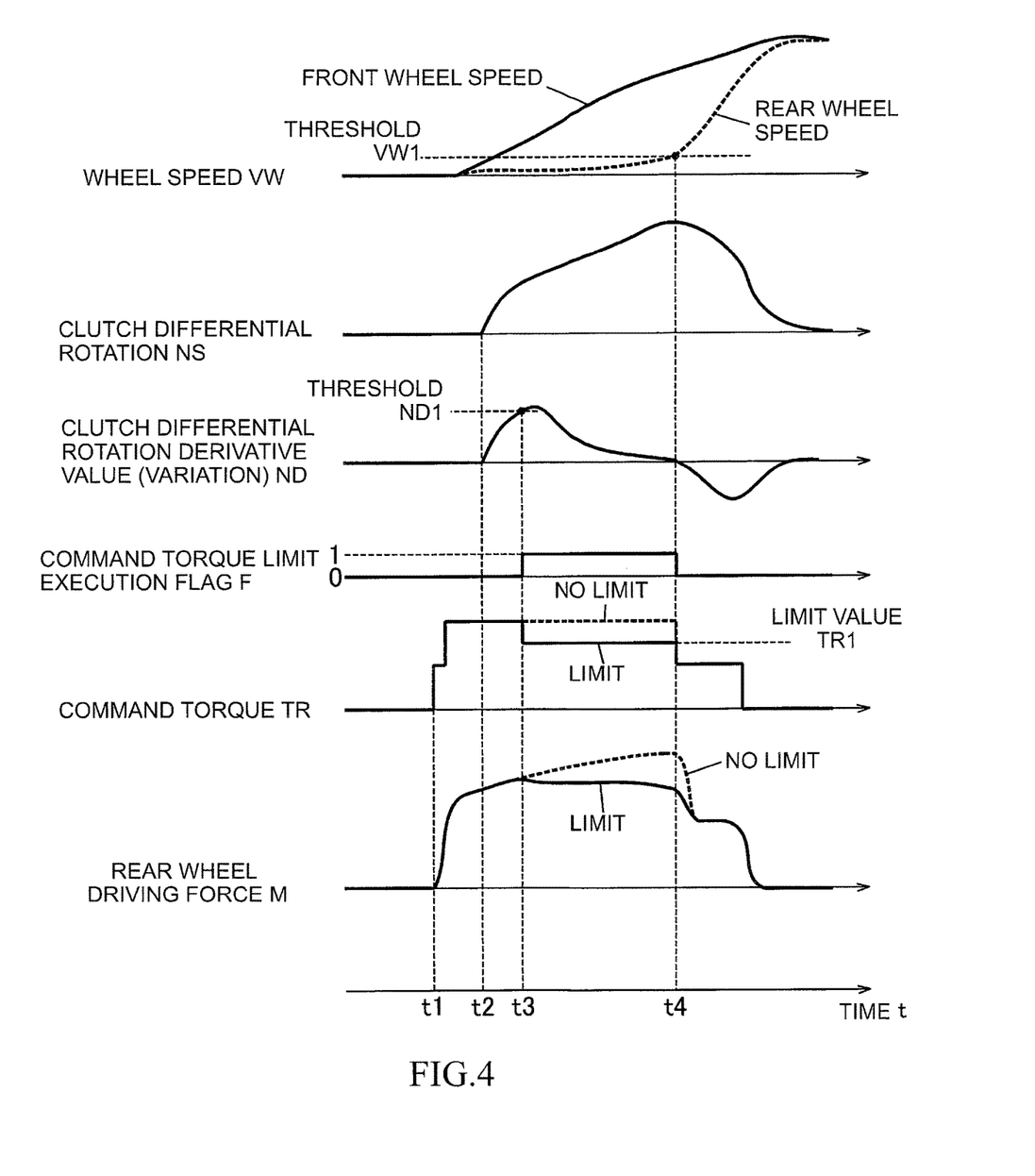
FIG. 4 is a time chart of an operational example according to the present invention.

FIG. 4 is a time chart (timing chart) illustrating an operational example of the control block shown in FIG. 3, showing changes, corresponding to elapsed time t, in a wheel speed VW (namely, a front wheel speed VWF and a rear wheel speed VWR), a clutch differential rotation speed (NS), a derivative value (variation per unit time) ND of the clutch differential rotation speed, a command torque limit execution flag F, a command torque TR, and a driving force (namely, generated torque) M generated to the rear wheels W3, W4, from top to bottom. This timing chart shows changes in each value when the VSA switch 71 is ON (namely, in the operation of the VSA control). As shown in the figure, a command torque TR for the clutch 10 occurs at time t1, whereby the torque is transmitted to the rear wheels W3, W4 via the clutch 10. Afterwards, a differential rotation occurs to the clutch 10 at time t2, whereby the clutch differential rotation speed NS and the derivative value ND of the clutch differential rotation speed NS start rising. And later at time t3, the derivative value ND of the clutch differential rotation speed NS becomes greater than or equal to a preset threshold (first threshold) ND1 (ND>=ND1), whereby the command torque limit execution flag F becomes 0 (namely, no command torque limit)→1 (command torque limit). Thus, after the same time, the command torque TR is limited to the limit value TR1. Therefore, the command torque TR is limited to a lower value (indicated by the actual line) compared to the case of the driving force M without limit occurring to the rear wheels W3, W4 (indicated by the dotted line). Afterwards at time t4, the wheel speed VWR of the rear wheels W3, W4 becomes greater than or equal to a preset threshold (second threshold) VW1 (VWR>=VW1), whereby the command torque limit execution flag F becomes 1 (command torque limit)→0 (no command torque limit). Thus, after the same time, the limit of the command torque TR to the limit value TR1 is released, and the driving force M occurring to the rear wheels W3, W4 becomes a value without limit.

It should be noted that the above-described threshold (second threshold) VW1 of the wheel speed VWR of the rear wheels W3, W4 can be set to, for example, a speed (for instance, 0) at which the rear wheels W3, W4 can be consider to be substantially at stop.

In addition, although any data of the vehicle body speed is omitted in FIG. 4, the control of limiting the command torque TR to the limit value TR1 (command torque limit control) from time t3 to time t4 is performed under the condition that the vehicle body speed is smaller or equivalent to a predetermined threshold speed.

As described above, the vehicle 1 of this embodiment includes the torque transmission path 20 that transmits a torque of power from the engine 3 to the front wheels (first driving wheels) W1, W2 and the rear wheels (second driving wheels) W3, W4, the torque distributor 10 including the hydraulic drive-type multidisc friction-type connecting and disconnecting means disposed between the engine 3 and the rear wheels W3, W4 in the torque transmission path 20, and the control means 60 that acquires a demand value of the torque (power) distributed to the rear wheels (W3, W4) using the clutch 10 and outputs a command value of the torque according to the demand value of the torque. When the derivative value ND (variation per unit time) of the differential rotation speed NS between the engine 3 side and the rear wheel W3, W4 side with respect to the torque distributor 10 in the torque transmission path 20 is greater than or equivalent to the predetermined threshold (first threshold) ND1, the control means 60 is configured to perform the torque command value limit control that limits the command value of the torque to smaller than or equivalent to the predetermined limit value TR1.

In other words, the control device of this embodiment judges that a torque occurring to the clutch 10 may be excessive beyond the allowance, and then performs control to limit the command torque TR (command control amount) based on the predetermined torque limit (namely, performs the torque command value limit control), if all of the following conditions are fulfilled: [1] the command torque TR value (command control amount for the clutch 10) is greater than or equivalent to the threshold TR1; [2] the vehicle body speed is less than the threshold; and [3] the derivative value ND (variation per unit time) of the clutch differential rotation speed is greater than or equivalent to the threshold ND1. In addition, if either condition [1], [2] or [3] is unsatisfied during the execution of the above-described torque command value limit control, the said torque command value limit control is terminated, and then the normal control without limiting the command torque TR (command control amount) is resumed.

In the vehicle 1 configured to distribute and transmit a torque to the rear wheels W3, W4 by the clutch 10 of this embodiment, an excessive torque exceeding the allowance is easier to occur to the clutch 10 in the case that the derivative value (variation per unit time) ND of the differential rotation speed of the clutch 10 is excessive than the case that the differential rotation amount of the clutch 10 is excessive. Because of this, in the control of this embodiment, when the derivative value ND of the differential rotation speed between the engine 3 side and the rear wheel W3, W4 side with respect to the clutch 10 in the torque transmission path 20 is greater than or equivalent to the threshold (first threshold) ND1, the torque command value limit control is performed for limiting the said torque command value TR to smaller than or equivalent to the predetermined limit value TR1. This can secure the running performance necessary for the vehicle and avoid an excessive torque (power) exceeding the allowance from occurring (being input) to the clutch 10

Moreover, in the control of this embodiment, the above-described torque command value limit control is performed when the wheel speed VWR of the rear wheels W3, W4 (second driving wheels) is smaller than or equivalent to the threshold (second threshold) VW1.

According to this configuration, by performing the torque command value limit control when the wheel speed VWR of the rear wheels W3, W4 is smaller than or equivalent to the predetermined threshold VW1, the torque command value limit control can be performed more surely in a situation where any occurrence (input) of an excessive torque to the clutch 10 is preferably evaded (for instance, in a situation where on a rough road, the front wheels W1, W2 are idling at a relatively high speed and the rear wheels are substantially at stop). On the other hand, the torque command value limit control can be preferably evaded in a situation where the driving performance of the vehicle 1 is preferably secured more surely (for instance, in a situation where the vehicle 1 is running on a hill-climbing road). Thus, the torque command limit control can both properly protect the components such as the case of the clutch 10 and secure the running stability necessary for the vehicle 1.

Further, the clutch (namely, front and rear torque distribution clutch) 10 of the present embodiment is a device including the hydraulic drive-type multidisc friction-type (namely, connecting and disconnecting means). In this hydraulic drive-type multidisc-friction type clutch, an excessive torque (so-called, "skid torque") exceeding an allowance is easy to occur when the variation per unit time of the differential rotation speed is excessive. However, in this embodiment, the execution of the above-described torque command value limit control can effectively prevent the occurrence of such excessive torque.

Figure 5:
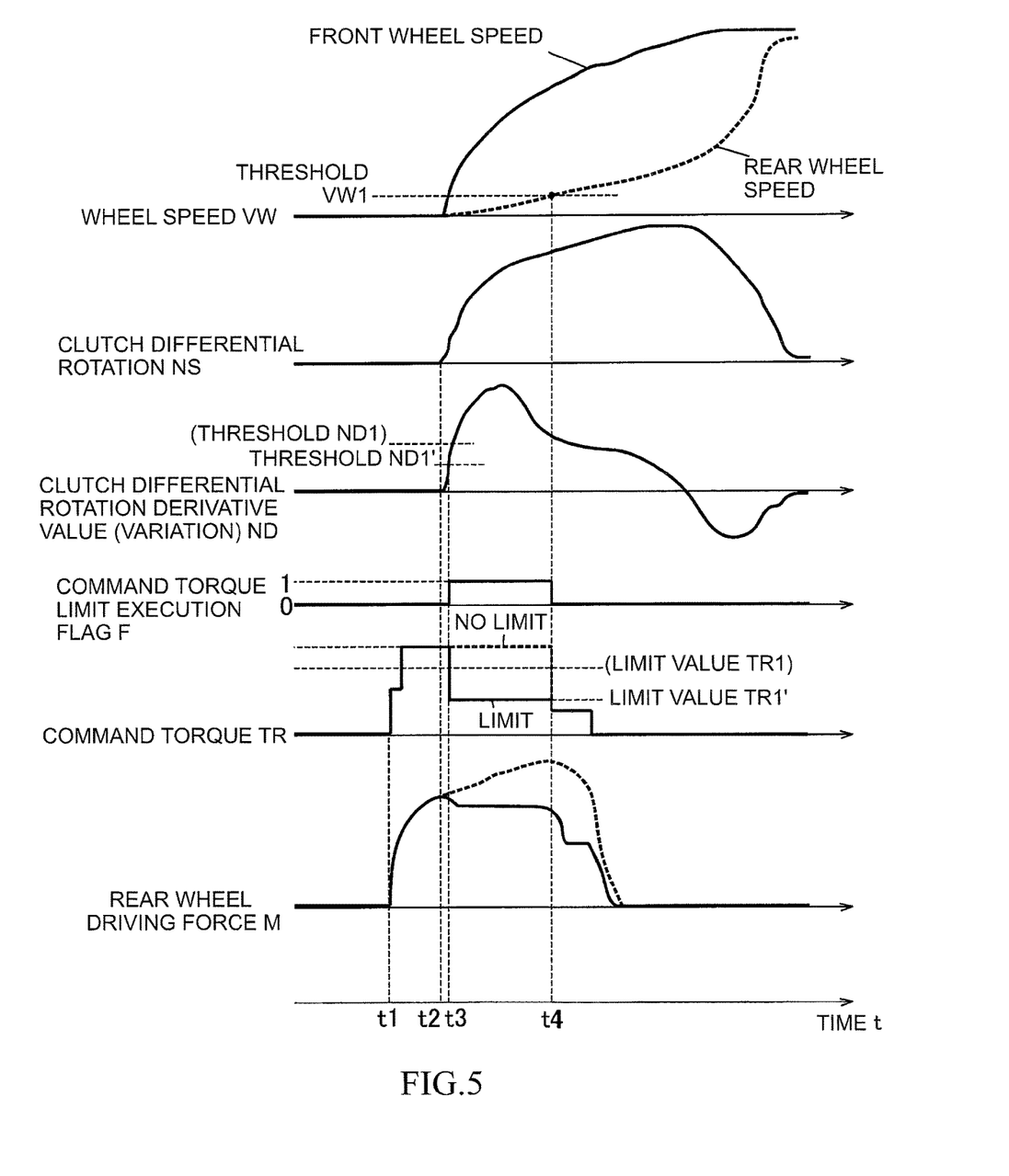
FIG. 5 is another time chart of an operational example according to the present invention.

FIG. 5 is another time chart (timing chart) illustrating an operational example of the control block shown in FIG. 3. This timing chart shows changes in each value when the VSA switch 71 is ON (namely, in the non-operation of the VSA control). In this case also, as shown in the figure, a command torque TR for the clutch 10 occurs at time t1, whereby the torque is transmitted to the rear wheels W3, W4 via the clutch 10. Afterwards, a differential rotation occurs to the clutch 10 at time t2, whereby the clutch differential rotation speed NS and the derivative value ND of the clutch differential rotation speed NS start rising. And later at time t3, the derivative value ND of the clutch differential rotation speed NS becomes greater than or equal to a preset threshold (first threshold) ND1', whereby the command torque limit execution flag F becomes 0 (namely, no command torque limit)→1 (command torque limit). Thus, after the same time, the command torque TR is limited to the limit value TR1'. Therefore, the command torque TR is limited to a lower value (indicated by the actual line) compared to the case of the driving force M without limit occurring to the rear wheels W3, W4 (indicated by the dotted line). Afterwards at time t4, the wheel speed VWR of the rear wheels W3, W4 becomes greater than or equal to a preset threshold (second threshold) VW1 (VWR>=VW1), whereby the command torque limit execution flag F becomes 1 (command torque limit)→0 (no command torque limit). Thus, after the same time, the limit of the command torque TR to the limit value TR1' is released, and the driving force M occurring to the rear wheels W3, W4 becomes a value without limit. And, the threshold ND1' of the derivative value ND in the OFF state of the VSA switch 71 shown in FIG. 5 is smaller than the threshold ND1 in the ON state of the VSA switch 71 shown in FIG. 4 (ND1>=ND1'). Also, the limit value TR1' of the command torque TR is smaller than the limit value TR1 shown in FIG. 4 (TR1>=TR1').

In this manner, in the control device of the present embodiment, the threshold of the derivative value ND of the clutch differential rotation speed NS (namely, first threshold) that is a value of the threshold for judging the execution of the torque command value limit control is differentiated depending on to ON/OFF of the VSA switch 71 that switches between the operation and non-operation of the VSA control (vehicle behavior stabilization control) by the operation of the driver. Specifically, the threshold ND' at the time of OFF of the VSA switch 71 is configured to be smaller than the threshold ND at the time of OFF thereof. Thus, since in the non-operation of the VSA control, the torque command value limit control can be performed at a stage of a smaller derivative value ND of the clutch differential rotation NS, the vehicle behavior due to the non-operation of the VSA control can be avoided from being destabilized.

Further, the predetermined threshold of the torque command value (command torque TR) in the torque command value limit control is differentiated depending on ON/OFF of the VSA switch 71. Specifically, the limit value TR1' at the time of OFF of the VSA switch 71 is configured to be smaller than the limit value TR1 at the time of OFF thereof. According to this, when the VSA control is in non-operation, the command value of the torque distributed to the rear wheels can be suppressed to a smaller value, which can effectively prevent an excessive torque from occurring to the rear wheels W3, W4 and evade the destabilization of the vehicle behavior due to the non-operation of the VSA control.

While an embodiment of the present invention has been described above, the present invention is not limited to the above-mentioned embodiment, but various modifications are possible within the scope of the technical idea as defined in the claims, the specification, and the drawings.

The invention claimed is:

1. A control device for a torque distributor, the control device comprising:
a torque transmission path transmitting a torque of power from a power source of a vehicle to first driving wheels and second driving wheels;
the torque distributor disposed between the power source and the second driving wheels in the torque transmission path;
a control means acquiring a demand value of a torque distributed to the second driving wheels using the torque distributor and outputs a command value of a torque corresponding to the demand value of the torque;
a vehicle behavior stabilizer performing control to stabilize a behavior of the vehicle; and
a switching operation section switching between operation and non-operation of the vehicle behavior stabilizer on the basis of an operation by a vehicle occupant,
wherein the control means performs a torque command value limit control limiting the command value of the torque to smaller than or equivalent to a predetermined limit value when a variation of a differential rotation speed between a power source side and a second driving wheel side with respect to the torque distributor in the torque transmission path is greater than or equivalent to a first threshold, and
wherein when the non-operation of the vehicle behavior stabilizer is selected by operating the switching operation section, the first threshold is a lower value compared to when the operation of the vehicle behavior stabilizer is selected.

2. The control device for the torque distributor according to claim 1, the control device comprising a wheel speed acquisition means acquiring a wheel speed of the second driving wheels,
wherein the control means performs the torque command value limit control when the wheel speed of the second driving wheels acquired by the wheel speed acquisition means is smaller than or equivalent to a second threshold.

3. The control device for the torque distributor according to claim 1, wherein the variation of the differential rotation speed is a derivative value of the differential rotation speed.

4. The control device for the torque distributor according to claim 2, wherein the variation of the differential rotation speed is a derivative value of the differential rotation speed.

5. The control device for the torque distributor according to claim 1, wherein the torque distributor includes a hydraulic drive-type multidisc friction-type connecting and disconnecting means.

6. The control device for the torque distributor according to claim 2, wherein the torque distributor includes a hydraulic drive-type multidisc friction-type connecting and disconnecting means.

7. The control device for the torque distributor according to claim 3, wherein the torque distributor includes a hydraulic drive-type multidisc friction-type connecting and disconnecting means.

8. The control device for the torque distributor according to claim 1, wherein when the non-operation of the vehicle behavior stabilizer is selected by operating the switching operation section, the predetermined limit value of the command value of the torque is a lower value compared to when the operation of the vehicle behavior stabilizer is selected.

9. The control device for the torque distributor according to claim 2, wherein when the non-operation of the vehicle behavior stabilizer is selected by operating the switching operation section, the predetermined limit value of the command value of the torque is a lower value compared to when the operation of the vehicle behavior stabilizer is selected.

10. The control device for the torque distributor according to claim 3, wherein when the non-operation of the vehicle behavior stabilizer is selected by operating the switching operation section, the predetermined limit value of the command value of the torque is a lower value compared to when the operation of the vehicle behavior stabilizer is selected.

11. The control device for the torque distributor according to claim 5, wherein when the non-operation of the vehicle behavior stabilizer is selected by operating the switching operation section, the predetermined limit value of the command value of the torque is a lower value compared to when the operation of the vehicle behavior stabilizer is selected.

* * * * *